No. 700,193.  
Patented May 20, 1902.

G. M. GUNDEL.
VEGETABLE STRAINER.
(Application filed Feb. 23, 1901.)

(No Model.)

Witnesses

Inventor:
George M. Gundel
By
Attorneys

UNITED STATES PATENT OFFICE.

GEORGE MARTIN GUNDEL, OF ROCHESTER, NEW YORK.

VEGETABLE-STRAINER.

SPECIFICATION forming part of Letters Patent No. 700,193, dated May 20, 1902.

Application filed February 23, 1901. Serial No. 48,436. (No model.)

*To all whom it may concern:*

Be it known that I, GEORGE MARTIN GUNDEL, a citizen of the United States, residing at Rochester, in the county of Monroe and State of New York, have invented a new and useful Vegetable-Strainer, of which the following is a specification.

This invention relates to improvements in vegetable strainers or mashers; and the object is to provide a utensil of this character by means of which the vegetables may be quickly strained and delivered in that condition to a receptacle placed therefor and at the same time removing therefrom skin or seeds and to construct the device in a simple manner, so that it may be manufactured and sold at a small price.

With the above object in view the invention consists in the novel features of construction hereinafter fully described, particularly pointed out in the claims, and clearly illustrated by the accompanying drawings, in which—

Figure 1:
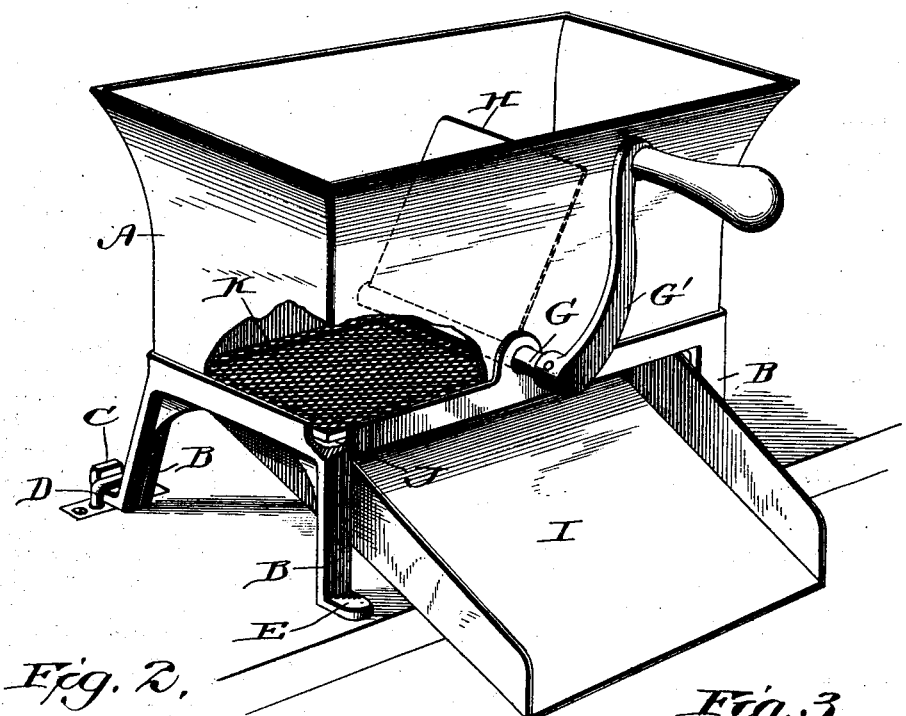
Figure 2:
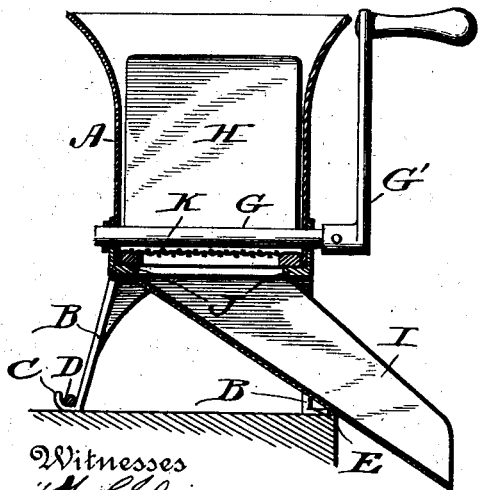
Figure 3:
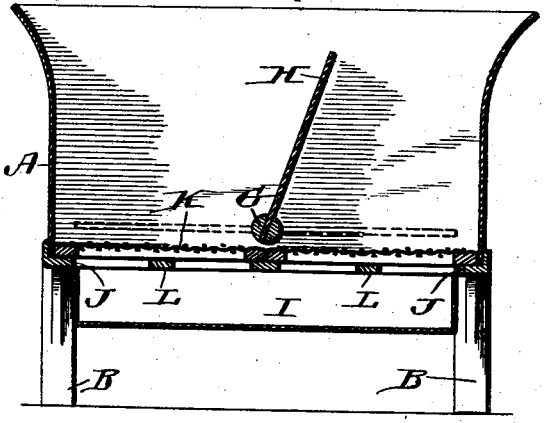

Figure 1 is a perspective view of a strainer constructed in accordance with my invention; Fig. 2, a vertical transverse sectional view, and Fig. 3 a vertical longitudinal sectional view.

Referring now more particularly to the accompanying drawings, A designates a receptacle which is preferably formed of metal and having its side and end walls at their upper ends formed flaring to provide a large inlet thereto. The receptacle A is provided with a pair of supporting-legs B at each end of its bottom edge, one leg of each pair having its lower end bent to form a hook C to engage in a loop D, secured to the table or other support. The other leg of each pair has its lower end bent at an angle to form a foot E. Mounted in the receptacle near its bottom is a transversely-extending shaft G, which at one end projects through the side wall of said receptacle and has attached thereto an operating-handle G'. Secured upon the shaft within the receptacle is a plate H, which extends laterally of the shaft and is adapted to be moved downwardly toward the lower end of the receptacle and upon each side of the shaft by the rocking of said shaft. The bottom of the receptacle is open, and secured beneath said bottom and inclined downwardly and forwardly is a discharge-chute I, which conducts the vegetables after they have been strained to a pan or receptacle placed to receive the same.

Formed about the edge of the opening at the bottom of the receptacle is a bead or flange J, upon which removable screens K, of wire-gauze, are supported, each screen being of such size as to be readily removable from the receptacle for cleaning. The screens are suitably supported intermediately of their ends by cross-pieces L, extending transversely of the receptacle at the bottom thereof.

In operation the cooked vegetables are placed in the receptacle and the shaft rocked to give to the plate a reciprocatory movement, which forces the vegetables through the screens and into the discharge-chute. The seeds and skin cannot pass though the fine meshes of the screens, and hence the vegetable is delivered in a strained condition free therefrom.

It will be noticed that when the plate is moved downward the same does not fill the entire space between the shaft and the end wall of the receptacle, and this causes a mixing action of the vegetable being mashed or strained, so that the screens or sieves are prevented from becoming clogged.

My improved strainer operates effectively upon various kinds of fruit and vegetables, and its action is so rapid that the articles are strained before losing any material amount of their heat, which is very desirable.

Having thus fully described my invention, what I claim as new, and desire to secure by Letters Patent of the United States, is—

1. In a device of the character described, a receptacle having a screen-bottom, a shaft extending through the receptacle above the screen-bottom and adjacent thereto, and a flat plate secured to the shaft, the screen serving by engaging with the plate to prevent the complete rotation thereof, substantially as shown and described.

2. In a device of the character specified, a receptacle having open top and bottom and formed with a bead about its bottom, a removable screen-bottom on said bead, a shaft mounted transversely of the receptacle and substantially midway between its ends above the screen-bottom and adjacent thereto, a flat plate secured to said shaft, the screen serving to prevent the complete rotation of the plate by engaging the same, and means for actuating said shaft, substantially as shown and described.

GEORGE MARTIN GUNDEL.

Witnesses:
 FRANK MITCHELL,
 JAMES H. KULER.